United States Patent
Nicholson (10) Patent No.: US 12,193,904 B2
(45) Date of Patent: Jan. 14, 2025

(54) CIRCUMFERENTIAL MATRIX SYSTEM

(71) Applicant: DENTSPLY SIRONA INC., York, PA (US)

(72) Inventor: Peter John Nicholson, Katikati (NZ)

(73) Assignee: Dentsply Sirona Inc., York, PA (US)

( * ) Notice: Subject to any disclaimer, the term of this patent is extended or adjusted under 35 U.S.C. 154(b) by 54 days.

(21) Appl. No.: 18/323,536

(22) Filed: May 25, 2023

(65) Prior Publication Data

US 2023/0293263 A1    Sep. 21, 2023

Related U.S. Application Data

(62) Division of application No. 15/440,018, filed on Feb. 23, 2017, now Pat. No. 11,696,815.

(60) Provisional application No. 62/410,975, filed on Oct. 21, 2016, provisional application No. 62/298,686, filed on Feb. 23, 2016.

(51) Int. Cl.
   *A61C 5/85* (2017.01)

(52) U.S. Cl.
   CPC ....................................... *A61C 5/85* (2017.02)

(58) Field of Classification Search
   CPC ........................................................ A61C 5/85
   See application file for complete search history.

(56) References Cited

U.S. PATENT DOCUMENTS

| | | |
|---|---|---|
| 1,400,456 A | 12/1921 | Petrak |
| 1,512,014 A | 10/1924 | Bryar |
| 1,726,862 A | 9/1929 | Schustarich |
| 2,126,308 A | 8/1938 | Butler |
| 2,367,439 A | 1/1945 | Samphere |
| 2,400,172 A | 5/1946 | Siqveland |
| 2,560,553 A | 7/1951 | Christie et al. |
| 2,567,794 A | 9/1951 | Winett |
| 2,636,269 A | 4/1953 | Sweeten |
| 3,921,299 A | 11/1975 | Lazarus |
| 4,396,374 A | 8/1983 | Ericson |
| 5,055,045 A | 10/1991 | Dickie et al. |
| 5,562,275 A | 10/1996 | Weissenfluh et al. |
| 5,626,475 A | 5/1997 | Von Weissenfluh et al. |
| 6,079,978 A | 6/2000 | Kunkel |
| 6,234,793 B1 | 5/2001 | Brattesani et al. |

(Continued)

FOREIGN PATENT DOCUMENTS

| | | |
|---|---|---|
| DE | 641005 C | 1/1937 |
| WO | 9960946 A1 | 12/1999 |

(Continued)

OTHER PUBLICATIONS

International Search Report issued to counterpart application PCT/US2017/019009 dated May 11, 2017.

(Continued)

*Primary Examiner* — Nicholas D Lucchesi
*Assistant Examiner* — Hao D Mai
(74) *Attorney, Agent, or Firm* — SCHWEGMAN LUNDBERG & WOESSNER, P.A.

(57) ABSTRACT

A circumferential matrix system having a matrix band and a body, such that the body comprises a handle, a housing and a base, and a spindle within the body is attached to the handle. The matrix band on one end is permanently affixed to the spindle and the matrix band on another end is permanently affixed to an inside wall of the housing. The circumferential matrix system can be tightened around a tooth without the need or use of a retaining ring.

19 Claims, 10 Drawing Sheets

(56) References Cited

U.S. PATENT DOCUMENTS

| | | | |
|---|---|---|---|
| 6,520,052 | B1 | 2/2003 | Saunders et al. |
| 7,047,656 | B1 | 5/2006 | Parker |
| 8,517,732 | B2 | 8/2013 | Segal et al. |
| 8,747,831 | B2 | 6/2014 | Jin |
| 9,283,059 | B2 | 3/2016 | Pierson et al. |
| 2006/0003289 | A1 | 1/2006 | Schaffner |
| 2006/0112792 | A1 | 6/2006 | Ping |
| 2011/0189629 | A1 | 8/2011 | Kilcher et al. |
| 2011/0244421 | A1 | 10/2011 | Segal et al. |
| 2018/0008375 | A1 | 1/2018 | Nicholson |

FOREIGN PATENT DOCUMENTS

| | | | |
|---|---|---|---|
| WO | 2010061161 | A1 | 6/2010 |
| WO | 2012171018 | A1 | 12/2012 |

OTHER PUBLICATIONS

Written Opinion of the International Searching Authority issued to counterpart application PCT/US2017/019009 dated May 11, 2017.
International Preliminary Report on Patentability issued to counterpart application PCT/US2017/019009 dated May 11, 2017.

CIRCUMFERENTIAL MATRIX SYSTEM

RELATED APPLICATIONS

This application claims priority to, as a divisional application of, U.S. patent application Ser. No. 15/440,018, entitled "Circumferential Matrix System," filed Feb. 23, 2017, which claims priority to U.S. Provisional Patent Application Ser. No. 62/410,975, entitled Circumferential Matrix System," filed Oct. 21, 2016 and U.S. Provisional Patent Application Ser. No. 62/298,686, entitled Circumferential Matrix System," filed Feb. 23, 2016, the contents of all of which are incorporated herein by reference.

FIELD OF THE INVENTION

Disclosed herein is a circumferential matrix band system for use in restoring a tooth.

BACKGROUND

Circumferential matrix bands and the use of matrix bands are well known and widely utilized in restorative dentistry. One problem with circumferential bands in the prior art is that circumferential bands require tensioners that are removed once tightened or are left in place during the restoration procedure to retain the tension on the matrix band. In both cases, the restoration procedure is restricted by the presence of the tensioning device.

U.S. Pat. No. 6,234,793 discloses a dental matrix band used during tooth restoration procedures. The matrix bands have a smooth interior side which is placed in contact with the tooth requiring restoration. On the external surface is a frictional engagement surface which is at least a portion of its surface that is configured to provide increased friction. Such a matrix band is placed around a tooth to be restored with the frictional engagement surface facing the embrasure or space between the teeth. A dental wedge can then be inserted into the embrasure against the frictional engagement surface to hold the dental matrix band stationary with respect to the tooth being restored. The frictional engagement surface is sufficiently rough that dental wedges are much less likely to slip out of an embrasure once positioned against the frictional engagement surface, thereby ensuring that a matrix band will be securely held in place by a dental wedge to enable the practitioner to confidently proceed with the restoration. The matrix bands may be formed from opaque materials such as stainless steel or from materials which are at least translucent.

U.S. Pat. No. 5,626,475 discloses a dental matrix tensioner has a casing containing a pin rotatable relative to the casing, the pin having a slot therein for releasably receiving a dental matrix and for tightening the matrix about a tooth upon rotation of the pin relative to the casing. A device to rotate the pin relative to the casing comprises an elongated assembly, and a member slidable lengthwise of the assembly in one direction to grip external portions of the casing and in an opposite direction to release those external portions of casing thereby selectively releasably to retain the rotating device in assembled relation with the casing. The lengthwise slidable member is also rotatable and is selectively engageable with the pin to rotate the pin upon rotation of the slidable member. The slidable and rotatable member has a noncircular end which fits removably in a noncircular recess in the pin whereupon when that end is inserted in the noncircular recess and sliding member is rotated, the pin is turned relative to the casing.

U.S. Pat. No. 5,562,275 discloses a flexible spindle suitable for transmitting a torque as well as an axial thrust is constituted by a plurality of helical spirals of wire all of the same length. Each spiral has opposite winding directions to the winding direction of the adjacent spirals and the outer diameter of each spiral is equal to the inner diameter of the spiral which surrounds it. The terminal ends of the spirals are assembled integrally with each other and with the terminal ends of a flexible member situated inside the innermost spiral. Each spiral has a length which is equal to that of the other spirals as measured along their axis when these are in their bent operating position and under those conditions under which they are designed to transmit torque and thrust, with the flexible spindle resulting not to be radially or longitudinally deformable when under stress, thus transmitting the forces without loss.

U.S. Pat. No. 5,055,045 discloses a dental matrix retainer package includes a plastic matrix retainer clamp which permits a matrix band to be unlocked from its tightened position over a tooth without releasing the matrix band from the clamp entirely, permits a matrix band to be swiveled to accommodate different mouth quadrants with removal for reorientation, permits rapid retraction of a matrix band from a tooth, and permits careful tightening of a matrix band over a tooth in order to avoid the possibility of overtightening. The package is designed so that it must be entirely disposed of after use on a patient, thereby providing maximum assurance against cross contamination.

U.S. Pat. No. 8,517,732 discloses a dental matrix clamp that includes an elongate body and a matrix band mountable relative to the body so as to form a loop projecting at one end of the body. The clamp has a tensioning device operable on the band to tighten the loop, and a deflector member which engages the band to provide an inclined conformation thereto. The deflector member is adjustable transversely across the band between opposite positions at which it bears against opposite peripheral portions of the band. The clamp is a hand-held device used in dentistry to clamp a band around a tooth for retention and molding of filling material.

SUMMARY

In embodiments, disclosed is a circumferential matrix system, having a matrix band, a body having a handle, a housing and a base, a spindle within the body being attached to the handle. One end of the matrix band is permanently affixed to the spindle and the other end of the matrix band is also permanently affixed to the inside wall of the housing.

The circumferential matrix system disclosed herein has many benefits over matrix systems already in the field. For example, the circumferential matrix system disclosed herein is compact such that the entire system can fit in a patient's mouth, does not require an applicator, and includes a locking device that allows tightening, loosening and tactile feedback to the user.

DETAILED DESCRIPTION

Figure 1:
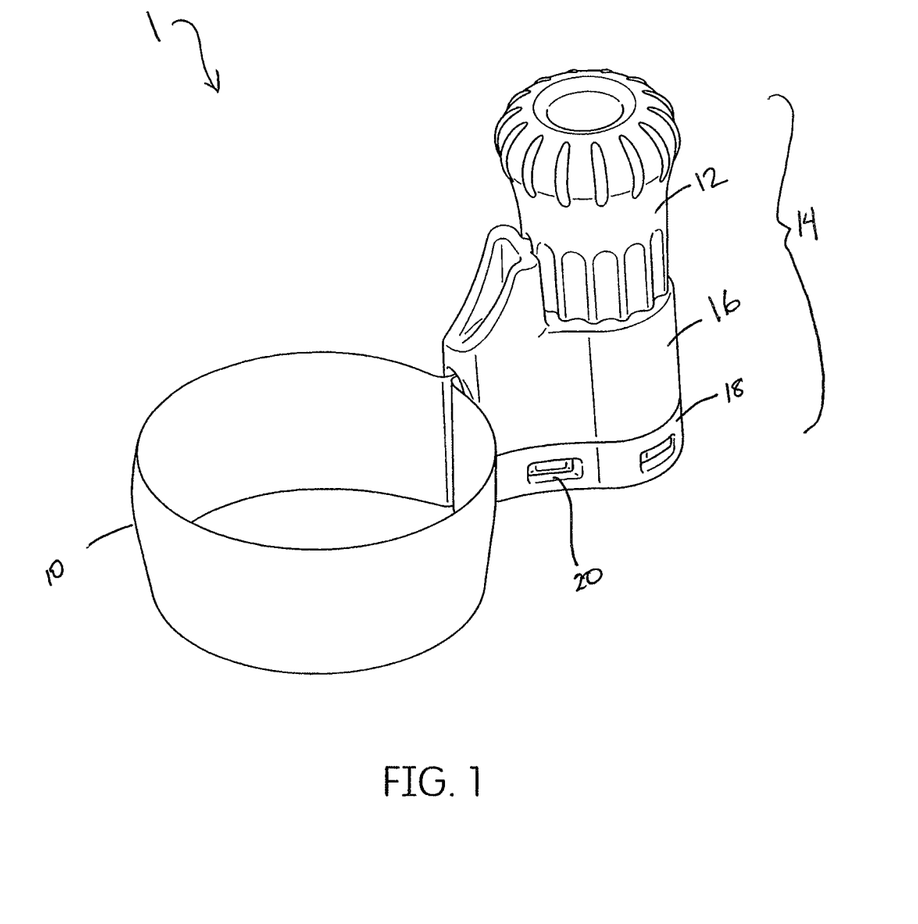
FIG. 1 demonstrates the circumferential matrix system disclosed herein.

FIG. 1 shows the circumferential matrix system described herein prior to use. The matrix band 10 can be made of the same material as any known conventional matrix band. This matrix band 10 may be uncoated or coated with any suitable material, such as Teflon® or an antibacterial material like that described in U.S. Pat. No. 8,747,831 which is incorporated by reference herein. In embodiments, this matrix band 10 may be contoured as for example shown in FIG. 1 to somewhat correspond to the general anatomical shape of a tooth.

The body 14 of the circumferential matrix system 1 disclosed herein includes a handle 12, housing 16, and base 18. The handle 12 of the body may be is turned in order to wind the matrix band 10 tighter when placed around a tooth. This motion is better shown in FIGS. 5 and 6. The housing 16 and base 18 of the body have a general tear drop shape in order to be better placed against the tooth of a patient. Once the matrix band 10 is tightened around the tooth, a retaining ring is generally not need to hold the matrix band in place. However, a retaining ring (not shown) may be necessary in order to provide spacing between the tooth being worked on and an adjacent tooth.

Figure 7:
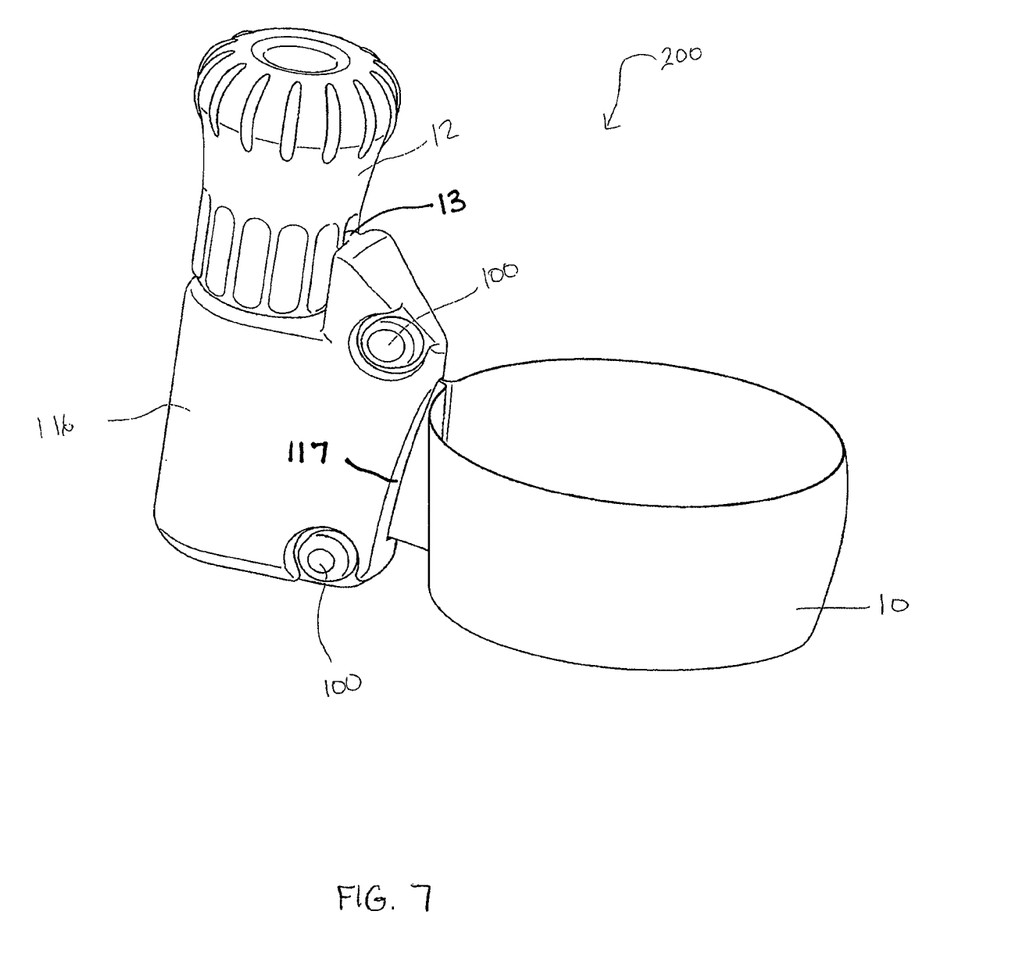
FIG. 7 demonstrates another embodiment of the circumferential matrix system disclosed herein.
Figure 8:
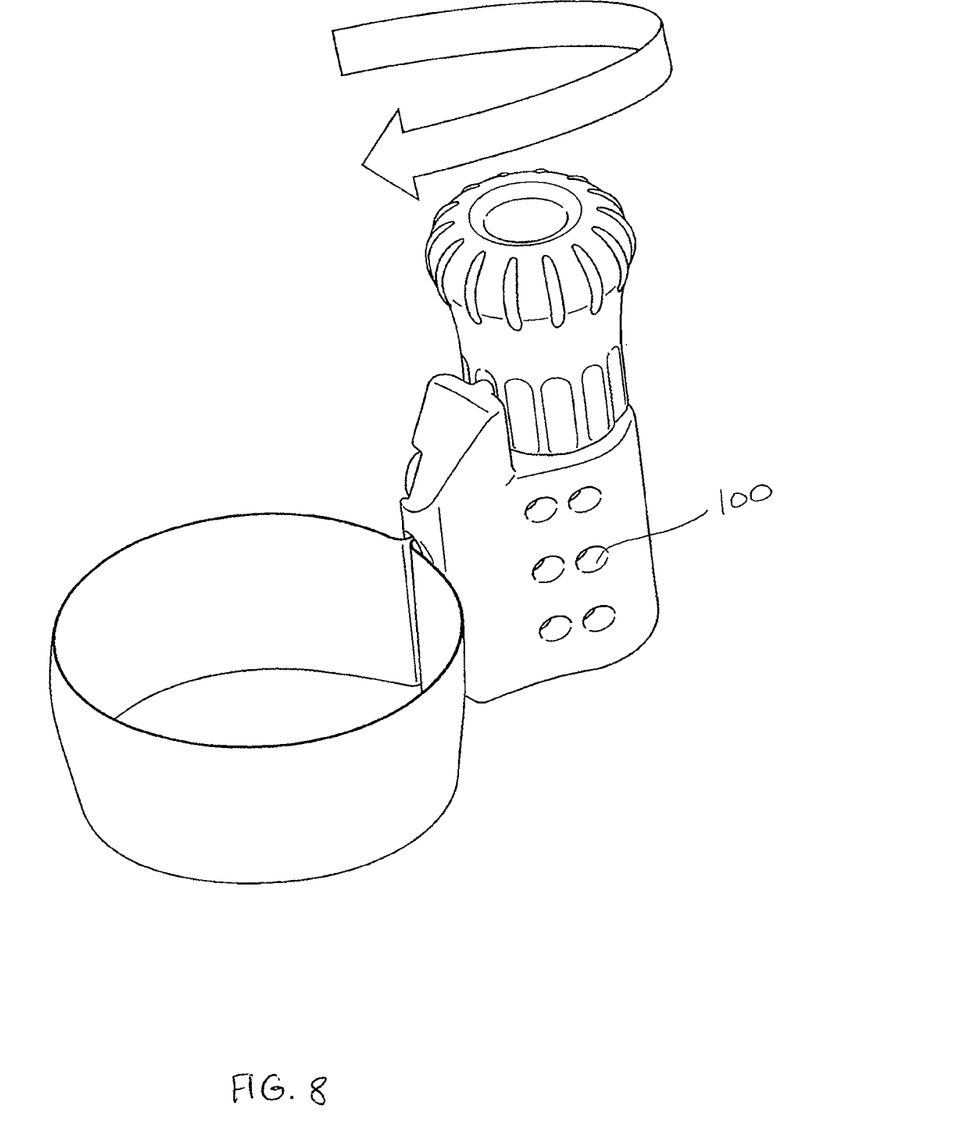
FIG. 8 demonstrates yet another embodiment of the circumferential matrix system disclosed herein demonstrating the directional rotation of the handle.
Figure 10A:
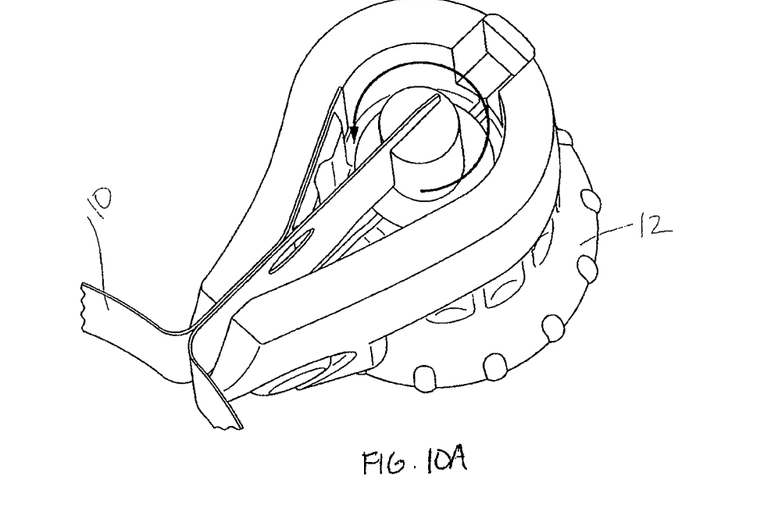
FIG. 10A demonstrates the internal placement of the matrix band within one embodiment of the circumferential matrix system disclosed herein.
Figure 10B:
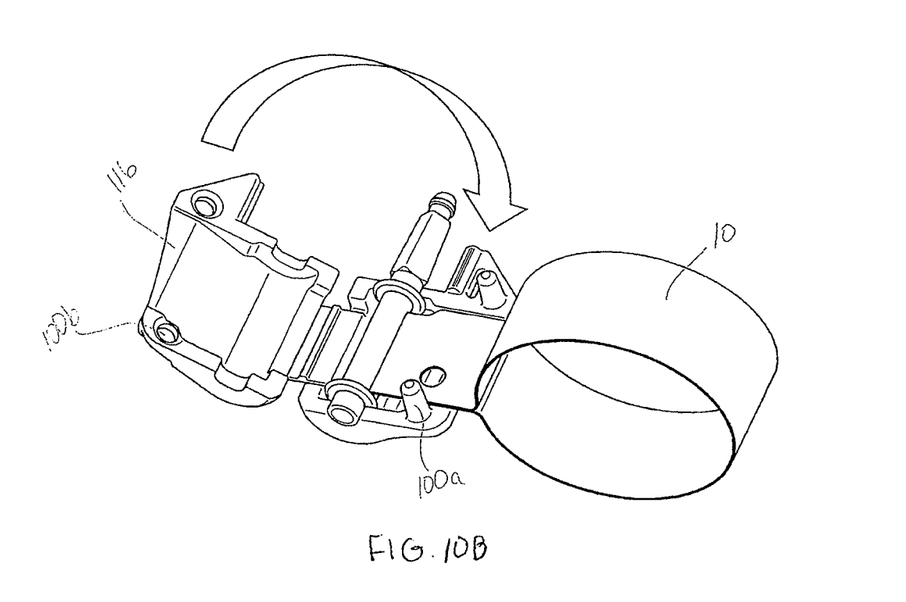
FIG. 10B demonstrates the internal construction of the housing of one embodiment of the circumferential matrix system disclosed herein.

FIG. 7 demonstrates another embodiment of the circumferential matrix system disclosed herein. In the matrix system 200 of FIG. 7 the housing 116 does not include a base. Specifically, the housing 116 of the matrix system 200 is formed more as a clam shell like structure as demonstrated in FIG. 10B where heat stakes 100 are used to enclose the matrix band 10 within the house 116 of the circumferential matrix system 200. The heat stakes 100 of the embodiment are made from a male portion 100a and a female portion 100b (as shown in FIG. 10B). As demonstrated by FIGS. 7 and 8, the heat stakes 100 can be placed in a suitable formation on the housing 116 so long as the housing 116 is properly closed and does not interfere with the placement of the matrix band 10 therein. The matrix system 200 of FIG. 7 includes a locking device/tab 13 that provides tactile feedback for the user while tightening and loosening. The matrix system, 200 of FIG. 7 further includes anatomically shaped interface 117, which is the portion of the body where the body, band and tooth meet. This anatomically shaped surface 117 assist in keeping the matrix system 200 on a patient's tooth when in use.

Figure 2:
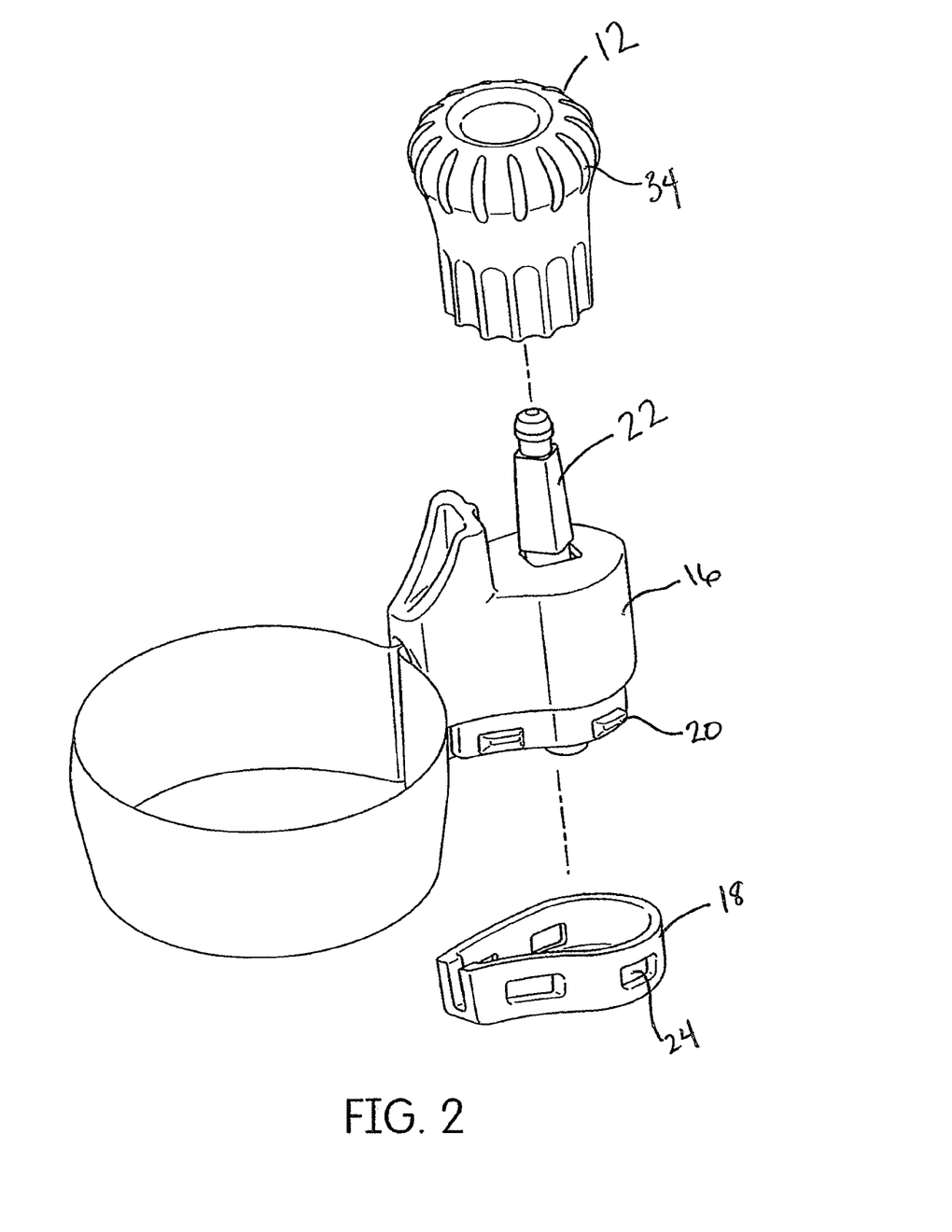
FIG. 2 demonstrates a partially exploded view of the circumferential matrix system disclosed herein.
Figure 3:
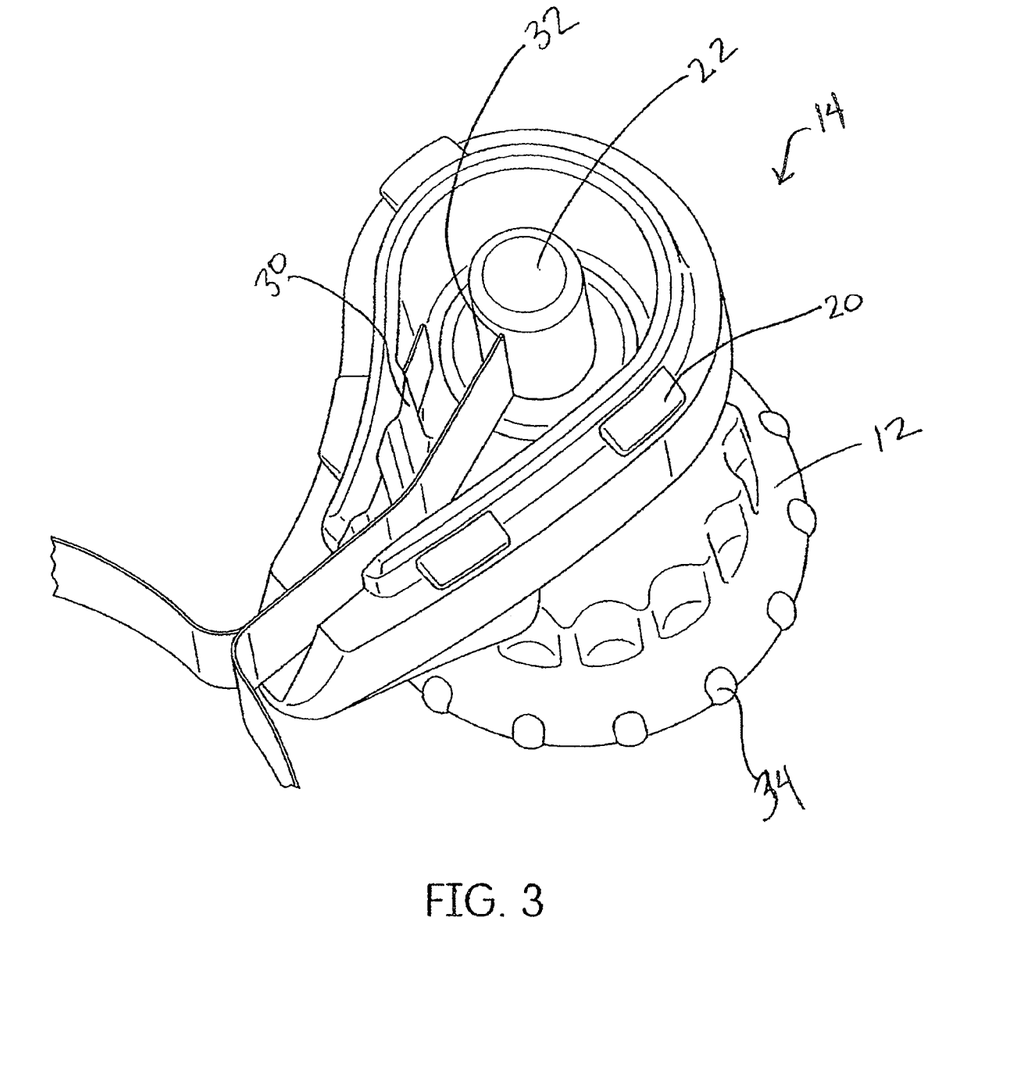
FIG. 3 demonstrates the internal placement of the matrix band within the circumferential matrix system disclosed herein.

FIG. 2 demonstrates a partially exploded view of the body 14 of the circumferential matrix system 1. The housing includes tabs 20 that affix into an aperture 24 of the base 18 such that the body of the circumferential matrix system 1 is formed. As can be seen in FIG. 2, the handle 12 includes grips 34 to assist a user in tightening the matrix band 10 around a tooth. When the handle 12 is wound, the spindle 22 within the housing actuates the tightening of the matrix band 10. As seen in FIG. 3, the matrix band 10 is attached to the spindle 22 at location 32. When the spindle 22 is wound by the user, the matrix band 10 is also wound around the spindle 22 inside the body 14, thereby tightening the matrix band around the tooth. The other end of the matrix band 10 is molded 30 into the housing as shown in FIG. 3. Because this end of the matrix band 10 is not movable, the matrix band 10 can be wound about the spindle 22.

Figure 4:
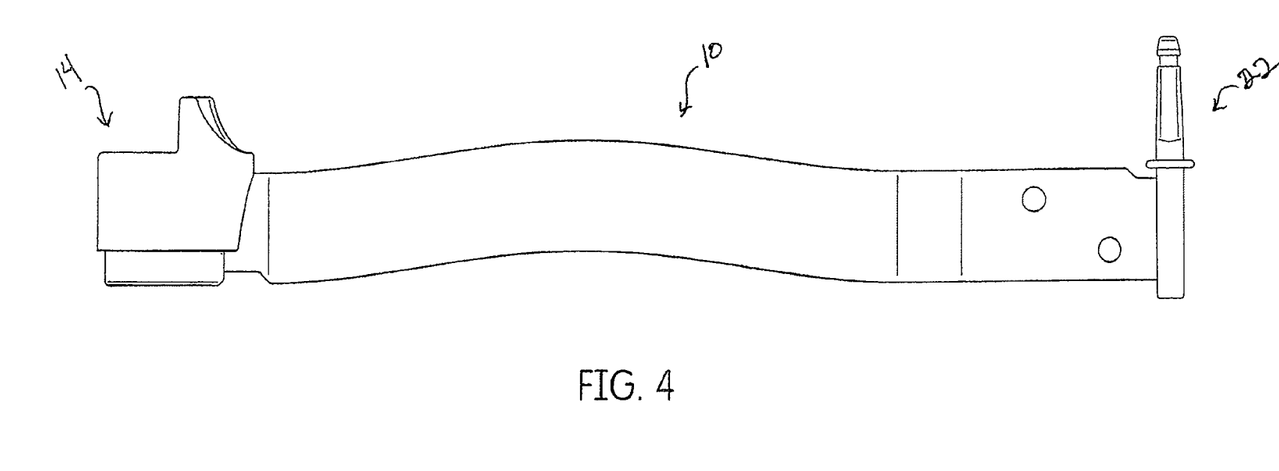
FIG. 4 demonstrates the matrix band prior to being formed into the circumferential matrix system disclosed herein.
Figure 11:
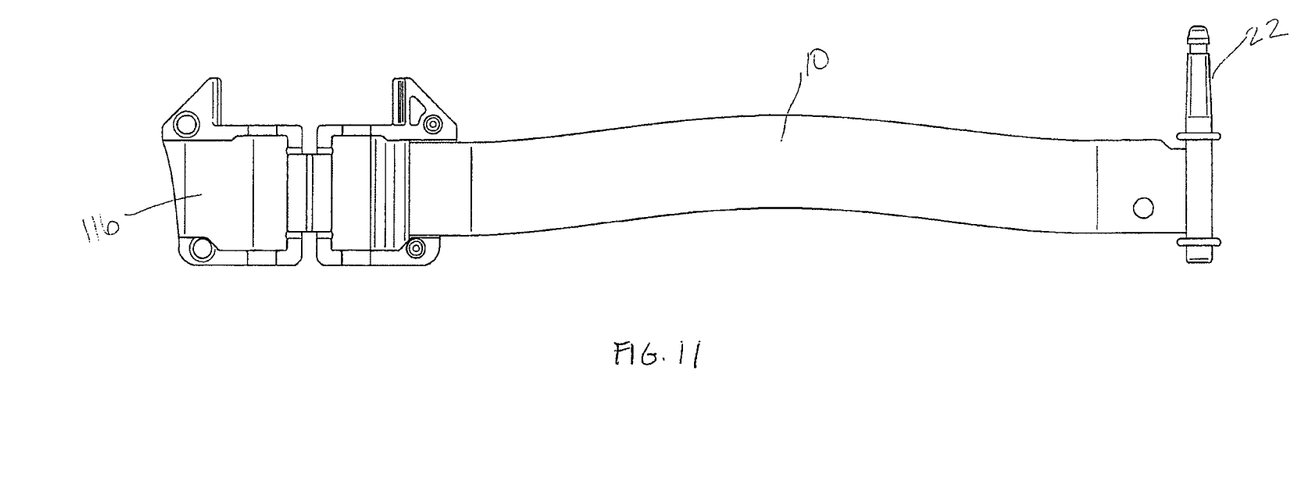
FIG. 11 demonstrates the matrix band prior to being formed into one embodiment of the circumferential matrix system disclosed herein.

FIG. 4 demonstrates how the matrix band 10 is attached to the spindle 22 and molded into the housing 16. The spindle 22 of FIG. 4 is then placed inside the housing 16 as shown in FIG. 3 so that circumferential matrix system 1 can be generally formed. Similar to FIG. 4, FIG. 11 demonstrates how the matrix band 10 is attached to the spindle 22 and molded into the housing 116. The spindle 22 of FIG. 11 is then placed inside the housing 116 as shown in FIG. 10B so that the circumferential matrix system 200 can be general formed.

Figure 9A:
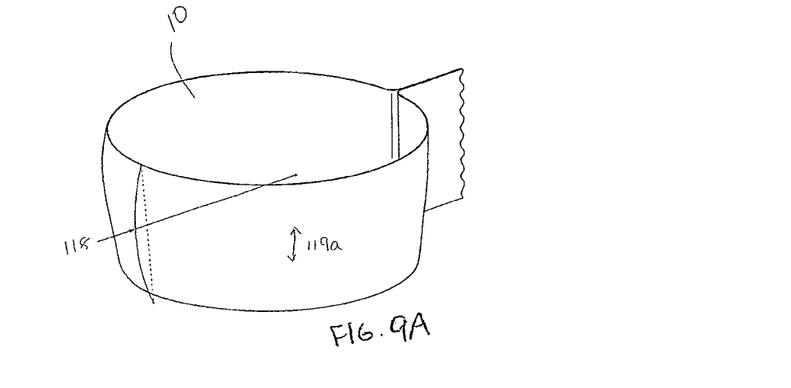
FIG. 9A demonstrates a band contour having a single radius curvature.
Figure 9B:
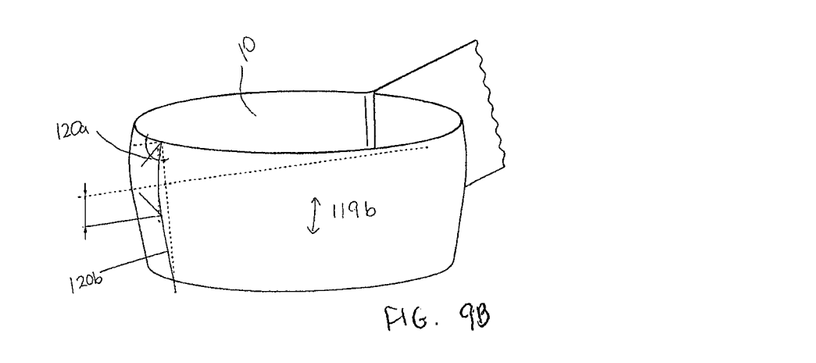
FIG. 9B demonstrates a band curvature having a single spline curvature with a straight line.
Figure 9C:
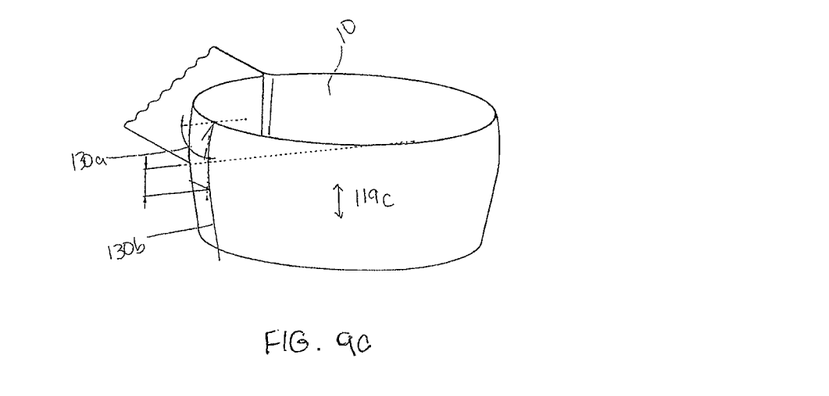
FIG. 9C demonstrates another band curvature having a different single spline curvature than that of FIG. 9B with a straight line.

As shown in FIGS. 9A, 9B and 9C, the matrix band 10 may be formed in a variety geometries so long as the geometry conforms to a tooth of the patient. For example, FIG. 9A demonstrates a matrix band 10 that has a single radius curvature 118 along the longitudinal direction 119a of the matrix band 10. In contrast, FIG. 9B demonstrates a matrix band 10 having a single spline curvature 120a at one point and a straight line 120b along the longitudinal direction 119b of the matrix band 10. Similar to FIG. 9B, FIG. 9C demonstrates another matrix band embodiment having a single spline curvature 130a at one point and a straight line 130b along the longitudinal direction 119c of the matrix band 10.

Figure 5:
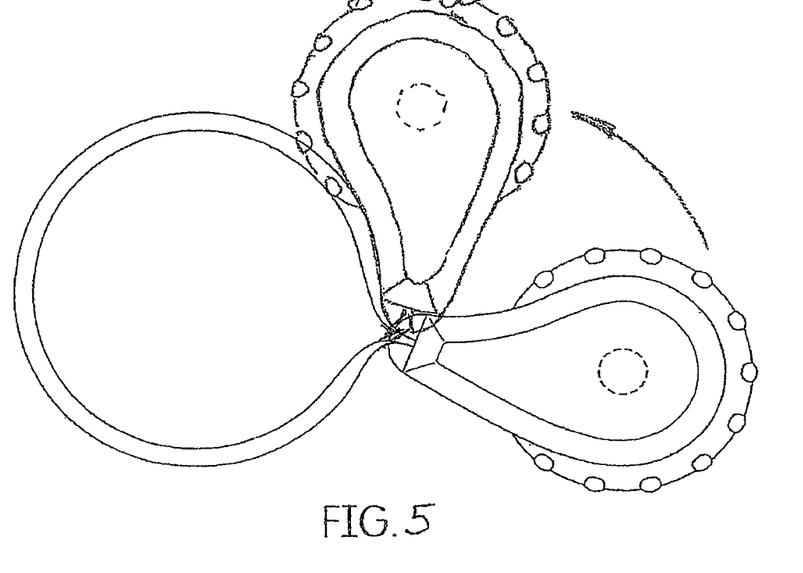
FIG. 5 demonstrates the circumferential matrix system disclosed herein from the bottom view where the movement of housing is shown.
Figure 6:
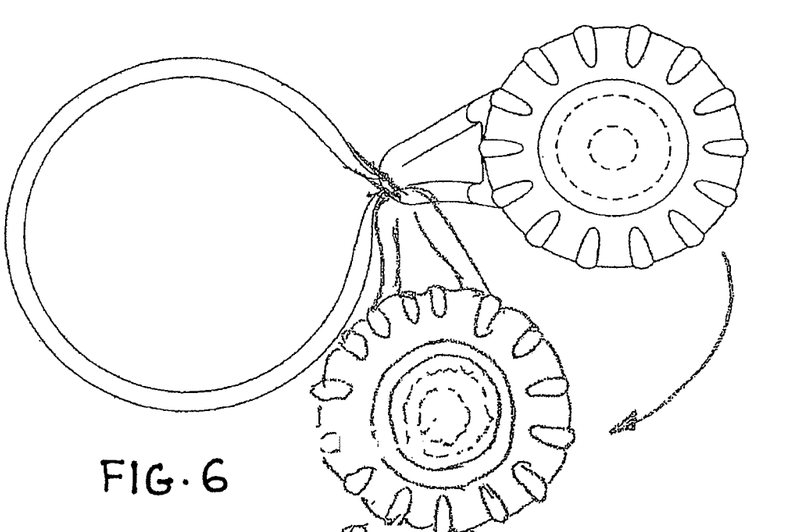
FIG. 6 demonstrates the circumferential matrix system disclosed herein from the top view where the movement of housing is shown.

As shown in FIGS. 5 and 6, in embodiments, the matrix band 10 is tightened by the handle being turned in a specific direction. The matrix band 10 can be tightened, loosened and re-tightened as required, without a tensioning device. As is particularly apparent from FIGS. 5 and 6, the tear drop shape of the body 14 is important once the matrix band 10 is tightened. Because of the one-directional tightening and the tear drop shape, the circumferential matrix system 1 is able to better fit in between two adjacent teeth because the tear drop shape is somewhat anatomical.

I claim:

1. A method of forming a circumferential matrix system, the method comprising:
   providing a body including:
     a handle having a handle rotational axis; and
     a housing having an inside wall;
   providing a spindle having a rotational axis;
   providing a matrix band having a first end and a second end;

operationally and integrally attaching the spindle to the handle;

permanently affixing the first end of the matrix band to the spindle;

permanently affixing the second end of the matrix band to the inside wall of the housing; and closing the housing to form the circumferential matrix system such that the handle is connected to the housing via the spindle, the second end of the matrix band is not movable, and the handle rotational axis is the same as the spindle rotational axis within the housing.

2. The method according to claim 1, wherein the body has a tear drop shape such that a narrow end of the tear drop shape is configured to provide an anatomical shaped interface with a tooth of a patient when the circumferential matrix system is in use.

3. The method according to claim 1, wherein the body further includes a base disposed distal across the housing from the handle.

4. The method according to claim 3, wherein the housing includes tabs affixed into an aperture of the base such that the body of the circumferential matrix system is formed.

5. The method according to claim 1, wherein the matrix band is contoured.

6. The method according to claim 1, wherein the matrix band is coated.

7. The method according to claim 1, wherein the matrix band is uncoated.

8. The method according to claim 1, further including placing the spindle internally into the housing.

9. The method according to claim 8, wherein the spindle is radially surrounded by the housing other than a gap through which the matrix band extends.

10. The method according to claim 1, wherein closing the housing includes closing the housing around the matrix band using heat stakes.

11. The method according to claim 1, further comprising providing a locking device configured to provide tactile feedback for a user while tightening and loosening the matrix band.

12. The method according to claim 1, wherein the handle is thumbwheel shaped for fingertip gripping for adjustment of the matrix band and placement of the matrix band around a tooth of a patient.

13. The method according to claim 1, wherein the spindle is attached such that it is configured to be rotated around the spindle rotational axis by rotational movement of the handle about the handle rotational axis.

14. A method of forming a circumferential matrix system, the method comprising:

providing a matrix band having a first end and a second end, a spindle having a rotational axis, and a housing having an inside wall, the first end of the matrix band being permanently affixed to the spindle and the second end of the matrix band being permanently affixed to the inside wall of the housing;

providing a handle having a handle rotational axis;

operationally and integrally attaching the spindle to the handle;

placing the spindle internally into the housing; and closing the housing to form the circumferential matrix system such that the handle is connected to the housing via the spindle, the second end of the matrix band is not movable, and the handle rotational axis is the same as the spindle rotational axis within the housing, wherein the handle and the housing constitute a body.

15. The method according to claim 14, wherein the body has a tear drop shape such that a narrow end of the tear drop shape is configured to provide an anatomical shaped interface with a tooth of a patient when the circumferential matrix system is in use.

16. The method according to claim 14, wherein the body further includes a base disposed distal across the housing from the handle.

17. The method according to claim 16, wherein the housing includes tabs affixed into an aperture of the base such that the body of the circumferential matrix system is formed.

18. The method according to claim 14, further including placing the spindle internally into the housing.

19. The method according to claim 18, wherein the spindle is radially surrounded by the housing other than a gap through which the matrix band extends.

\* \* \* \* \*